United States Patent [19]

Sanderford, Jr. et al.

[11] Patent Number: 5,457,713
[45] Date of Patent: Oct. 10, 1995

[54] SPREAD SPECTRUM ALIGNMENT REPOSITIONING METHOD

[75] Inventors: H. Britton Sanderford, Jr., New Orleans; John R. Souvestre, Metairie, both of La.

[73] Assignee: Sanconix, Inc., New Orleans, La.

[21] Appl. No.: 206,173

[22] Filed: Mar. 7, 1994

[51] Int. Cl.$^6$ ............... H04B 1/707; H04B 1/69
[52] U.S. Cl. ............ 375/206; 375/200; 375/208; 375/362; 380/34
[58] Field of Search ............... 375/1, 111–113, 375/118; 380/34, 48

[56] References Cited

U.S. PATENT DOCUMENTS

| | | | |
|---|---|---|---|
| 4,119,926 | 10/1978 | Frosch et al. | 375/1 X |
| 4,122,393 | 10/1978 | Gordy et al. | 375/1 |
| 4,279,018 | 7/1981 | Carson | 375/1 X |
| 4,689,626 | 8/1987 | Hori et al. | 375/1 X |
| 4,799,062 | 1/1989 | Sanderford, Jr. et al. | 342/450 |
| 4,965,808 | 10/1990 | Maine | 375/1 |
| 4,977,577 | 12/1990 | Arthur et al. | 375/1 |
| 5,077,754 | 12/1991 | Namioka | 375/1 |
| 5,077,794 | 12/1991 | Taylor | 380/48 |
| 5,144,668 | 9/1992 | Malek et al. | 380/48 |

OTHER PUBLICATIONS

Dixon, Robert C., *Spread Spectrum Systems*, (2dEd), John Wiley & Sons, Inc.; 1984, pp. 186–197, 248–255.

Primary Examiner—Bernarr E. Gregory
Attorney, Agent, or Firm—Burns, Doane, Swecker & Mathis

[57] ABSTRACT

A method for maintaining spread spectrum chip sequence synchronization, over arbitrary time periods, without the use of traditional closed loop strategies. The technique can be accomplished entirely in software or with the addition of a minimum of electronic components. The receiver periodically forces a chip code reposition optimization to jog the receiver-chip sequence into a high level of synchronization after some period of time in which the receiver's chip sequence alignment has run open loop with respect to the transmitter-chip sequence embedded in the received spread-spectrum signal. The reposition technique allows the use of very low cost crystals for the chip sequence generator time base in both receiver and transmitter, and also provides time cues in which to optimize time-of-flight radio position fixes.

58 Claims, 3 Drawing Sheets

SPREAD SPECTRUM ALIGNMENT REPOSITIONING METHOD

BACKGROUND OF THE INVENTION

This invention relates to spread-spectrum signals, and more particularly to a method for maintaining a chip sequence at a receiver in synchronization with a chip sequence embedded in a spread-spectrum signal, without using conventional acquisition and tracking circuitry.

DESCRIPTION OF THE RELEVANT ART

Spread spectrum systems typically require synchronization techniques. Synchronization techniques, such as Costas loops, TAU-dither circuits, and delay-lock loops, have been long studied and are discussed in the literature. The prior art circuits have the advantage of closed loop control, but have the disadvantage of lowered performance unless used with constant carrier signals. They have the further disadvantage of requiring additional hardware and complexity for implementation. U.S. Pat. No. 4,977,577, entitled WIRELESS ALARM SYSTEM to Arthur et al., teaches a technique for achieving initial lock and extracting data contained in a brief spread-spectrum signal. The limitation to this technique is that the messages must be shorter than the time in which chip code lock is lost due to crystal drift between the transmitter and receiver or the synchronization achieved in the initial lock is gradually lost due to this drift between the receiver and transmitter crystals.

SUMMARY OF THE INVENTION

A general object of the invention is to maintain a chip sequence in lock over long message times.

Another object of the invention is to minimize external hardware, and lower transmitter and receiver cost by using software-assisted, chip sequence aligning techniques.

A further object of the invention is to reduce the crystal accuracy and drift required for maintaining continuous or prolonged chip sequence lock, thereby also lowering the cost of the hardware.

An additional object of the invention is to provide a unique message position/time marker so that the chip sequence position alignment can be utilized with lowered drift in time-synchronized systems such as time-of-flight radio location systems. The invention further allows for expanded lane separation in hyperbolic radio location systems.

The present invention, as embodied and broadly described herein, includes a method for maintaining a receiver-chip sequence in synchronization with a transmitter-chip sequence embedded in a spread-spectrum signal. The transmitter-chip sequence is defined as a chip sequence generated at a transmitter, and the receiver-chip sequence is defined as a chip sequence generated at the receiver. The method may be realized, in part, by using a processor located at the receiver. The processor is coupled to appropriate receiver circuitry for performing the required functions.

At the transmitter, the method includes the steps of generating the spread-spectrum signal. The spread-spectrum signal includes a period for initial synchronization, a marker, and data. The period for initial synchronization, the marker, and the data are transmitted sequentially as parts of the spread-spectrum signal. The period for initial synchronization, the marker, and the data are spread-spectrum processed with the transmitter-chip sequence to generate the spread-spectrum signal. The spread-spectrum signal is transmitted using radio waves from the transmitter.

At the receiver, the method includes the steps of generating the receiver-chip sequence. The receiver-chip sequence is identical to the transmitter-chip sequence. The method includes synchronizing, during the period for initial synchronization, the receiver-chip sequence to the transmitter-chip sequence. Thus, the period for initial synchronization, which may or may not be a period when no data are sent in the spread-spectrum signal from the transmitter, is used for initial acquisition and locking on to the spread-spectrum signal. During this process, the receiver-chip sequence is synchronized with the transmitter-chip sequence embedded in the spread-spectrum signal.

At the receiver, the method further includes detecting the marker embedded in the spread-spectrum signal. The marker typically might include a series of bits, for example, eight bits such as 1 0 1 1 0 0 1 0. Alternatively, the marker could be a string of 1 bits or a string of 0 bits. The marker, including other uses, is used to denote a position cue or a time from which a first reposition delay is determined at the receiver. The marker occurs after the period for initial synchronization, and before data on the spread-spectrum signal are transmitted from the transmitter. The marker can alternatively be interdisbursed with the data, provided the marker includes a sequence distinct from the transmitted data.

The method further includes, at the receiver, demodulating data from the spread-spectrum signal during the first delay. The first delay typically is a period of time, or bits, from the marker. The present invention may include extra bits time inserted into the spread-spectrum signal at the end of the first reposition delay. During this time of extra bits, or reposition bits, the receiver re-aligns the receiver-chip sequence with the transmitter-chip sequence embedded in the spread-spectrum signal. After re-aligning the receiver-chip sequence with the transmitter-chip sequence, the receiver continues to demodulate data from the spread-spectrum signal while the chip code synchronization runs open loop and accumulates drift.

The method may have more than a first reposition delay, and may have multiple reposition delays. During each reposition delay, the method includes the step of demodulating data from the spread-spectrum signal. At the end of each reposition delay, the method realigns the receiver-chip sequence with the transmitter-chip sequence embedded in the spread-spectrum signal. Accordingly, using reposition delays from the marker, the receiver-chip sequence and the transmitter-sequence are automatically realigned.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference is now made in detail to the present preferred embodiments of the invention, examples of which are illustrated in the accompanying drawings.

The present invention maintains a receiver-chip sequence in synchronization with a transmitter-chip sequence embedded in a spread-spectrum signal. The method may be realized using a processor, discrete circuitry, or logical gate components. These items would be located at the receiver. The appropriate receiver circuitry for performing the required receiver functions is illustrated herein.

At the transmitter, the method includes the steps of generating the spread-spectrum signal. The spread-spectrum signal has a period for initial synchronization, a marker, and data. The period for initial synchronization, the marker, and the data are transmitted together as one message, and each is sequentially a part of the spread-spectrum signal.

The period for initial synchronization may be a time period of the signal when a transmitter-chip sequence is transmitted with or without data modulation. Alternatively, the period for initial synchronization may include a preamble of bits, which would be embodied as preamble data imposed on the transmitter-chip sequence during the period for initial synchronization. Preambles for spread-spectrum signals are well known in the art.

The marker typically is a known bit pattern. For example, the marker may include an eight bit pattern, such as 1 0 1 1 0 0 1 0. The marker is used to designate a particular point in time, or position in the bit sequence, after the period for initial synchronization.

The data follow the period for initial synchronization and the marker. The data include the information being conveyed from the transmitter to the receiver.

The period for initial synchronization, the marker, and the data are spread-spectrum processed with the transmitter-chip sequence to generate the spread-spectrum signal. The spread-spectrum processing may be any of phase shift keying (PSK), amplitude shift keying (ASK), or frequency shift keying (FSK). Additionally, these modulation techniques may be combined to generate the spread-spectrum signal. Circuitry, methods and apparatus for implementing these modulation techniques are well known in the art. Examples of such circuitry are shown in U.S. Pat. No. 5,265,120, which is incorporated herein by reference. The spread-spectrum signal is transmitted using radio waves from the transmitter over the communications channel.

At the receiver, the method includes the steps of generating the receiver-chip sequence. The receiver-chip sequence is identical to the transmitter-chip sequence, for despreading of a received spread-spectrum signal.

Figure 1:
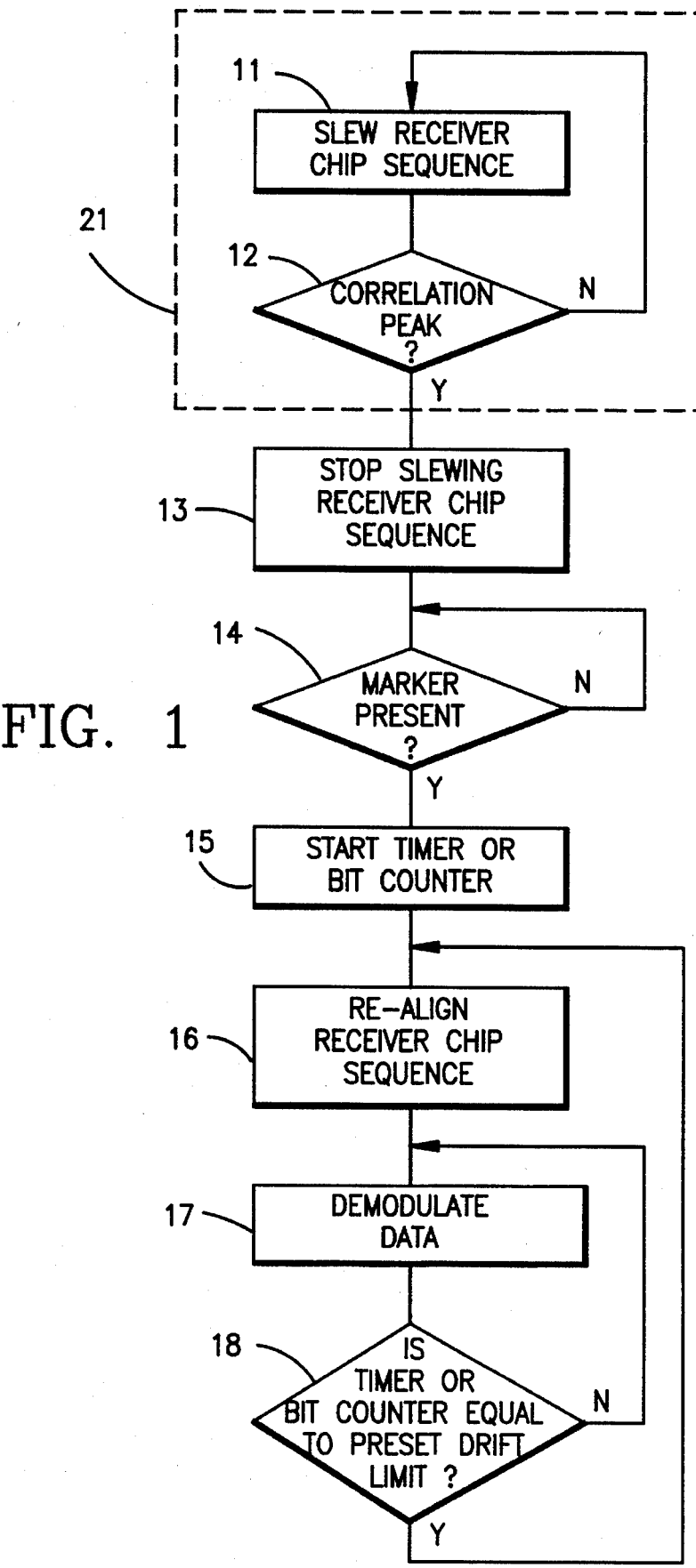
FIG. 1 is a flowchart illustrating the method of the invention.

As illustratively shown in FIG. 1, the method includes the step of synchronizing 21 the receiver-chip sequence to the transmitter-chip sequence. The initial synchronizing 21 would be accomplished during the period for initial synchronization of the spread-spectrum signal. The step of synchronizing 21 may, for example, be slewing 11 the receiver-chip sequence against the received spread-spectrum signal. The step of synchronizing 21 may further include the step of detecting 12 a correlation peak of the receiver-chip sequence cross-correlated with the transmitter-chip sequence. If a correlation peak is not detected 12, then the method continues slewing 11 the receiver-chip sequence until a peak is detected. Alternatively, other methods of initial synchronization may be used as is known in the art. When a correlation peak is detected 12, then the method stops slewing 13 the receiver-chip sequence and proceeds with the step of detecting 14 whether a marker is present in the spread-spectrum signal.

Thus, the method further includes the step of detecting 14 the marker embedded in the spread-spectrum signal. The marker is used to denote a time, or position in the transmitted signal, from which a first reposition delay is determined at the receiver. The marker occurs in the spread-spectrum signal after the period for initial synchronization, and before data are transmitted on the spread-spectrum signal. When the marker is detected 14, then the method initiates 15 a timer or bit counter or time stamp. The timer or bit counter or time stamp is used to determine a next, reposition delay. After the first marker is detected then an initial chip-code reposition resynchronization occurs, by re-aligning 16 the receiver-chip sequence with the transmitter-chip sequence. After re-aligning 16 the receiver-chip sequence, the receiver demodulates 17 the data embedded in the spread-spectrum signal, and outputs the data. The step of demodulating 17 uses the appropriate circuitry for detecting a spread-spectrum signal processed at the transmitter with the appropriate modulation, including ASK, FSK, PSK, or combination thereof.

At the end of the first reposition delay, the method repeats the step of re-aligning 16 the receiver-chip sequence with the transmitter-chip sequence. The step of re-aligning 16 can include slewing the receiver-chip sequence until a correlation peak is detected or any of the several techniques noted later in this text. When the correlation-peak is detected, the method continues to demodulate 17 data from the spread-spectrum signal. Additionally, the method includes the steps of determining 18 whether the timer or bit counter has reached a time or count precalculated to represent less than the maximum acceptable drift limit. If the timer or bit counter were not equal to the preset drift limit, then the method continues demodulating 17 data from the received spread-spectrum signal. If the timer or bit counter were equal to the preset drift limit, then the method initializes the step of re-aligning 16 the receiver-chip sequence position to within a chip time of the transmitter-chip sequence. In the instant invention re-alignment preferably is to within ⅛ of a chip time.

The present invention may have more than a first reposition delay, and may have multiple reposition delays. During each reposition delay, the method includes the step of demodulating data from the spread-spectrum signal. At the end of each reposition delay, the method re-aligns the receiver-chip sequence to within one chip time of the transmitter-chip sequence embedded in the spread-spectrum signal. Each subsequent reposition delay may be determined from a recurring marker, or alternatively, from preprogrammed delays from an initial marker.

At the beginning of a new transmission of a spread-spectrum signal, some finite time is spent in order to achieve initial chip sequence timing acquisition. This can be done under either hardware or software control, or some combination of both. Message data can be extracted for typically between three to 20 milliseconds, depending on baud rate and crystal accuracies of the receiver and transmitter. In this case, the longer the transmitted message, the higher the crystal cost at both the transmitter and receiver. In order for longer messages to be reliably received, additional synchronization techniques should be employed. The data synchronization techniques should rely on the transmitted signals in order to continuously or periodically realign the receiver-chip sequence phase position to match the transmitter-chip sequence of the transmitted signal.

Spread-spectrum systems can use data modulation techniques which are otherwise available to conventional narrow band systems. Some of these modulation techniques, such as amplitude shift keying (ASK), create periods of time when either less signal or no signal is present for the receiver to perform a code re-alignment routine upon. Further, other constant carrier modulation techniques such as fast frequency shift keying (FFSK) and binary phase shift keying (BPSK) experience sudden but small variations in received powers as the receiver-chip sequence alignment is purposely changed by the receiver's algorithm. This affects signal-to-noise ratio (SNR) and, in the minimum detectable signal (MDS) case, can affect the bit error rate (BER). Depending on the goals of the system, an impact on bit error rate may or may not be acceptable during the periodic receiver-chip sequence realignment optimizations generated by the receiver.

In either case, dummy bit times can be sent by the transmitter at a constant carrier level so that the receiver can re-optimize positions of the chip sequence during the dummy bit times without affecting information bits. The term "dummy bits" is defined herein to include an arbitrary sequence of bits, which do not necessarily carry information.

Preferably, the receiver is able to re-optimize the receiver-chip sequence position often enough so that the minimum SNR for the required bit error rate is maintained. If, for example, the design goal at the minimum detectable signal case is that the signal does not vary more than 1.25 dB due to receiver-chip sequence/transmitter-chip sequence misalignment, then in a typical 63 chip system, the chip sequence should not become more than ¼ of a chip out of alignment with the transmitter-chip sequence due to crystal drift. In an 800 nanosecond chip time system, this yields an allowable 200 nanosecond of chip sequence misalignment. Therefore, a chip sequence re-optimization should occur at the receiver at least once every two milliseconds if low cost, 50 parts per million (ppm) initial accuracy crystals are to be used. A difference in other circuit components, aging, voltage and in the operating temperature between the receiver and transmitter, also adds to the error, thus reducing message time even further.

The receiver can use well known techniques for correlation peak optimization such as signal strength measurement or quieting detection or any equivalent means to sense if the correlation peak is improved as the receiver changes receiver-chip sequence alignment in sub-chip steps. Furthermore, the receiver can use a number of techniques to determine a predicted receiver-chip sequence alignment drift correction. For example, the receiver can take two or more readings after repositioning the receiver-chip sequence alignment in order to determine the slope of the correction factor and then use the slope to generate a chip position correction factor and apply that correction factor.

Another technique for correlation peak optimization that the receiver can employ is to take a multiplicity of correlation improvement samples as the receiver consecutively increments the receiver-chip sequence alignment in sub-chip increments, thereby plotting out an actual correlation function. This procedure can optionally be preceded by an initial receiver-chip sequence misalignment with respect to the transmitter-chip sequence in the opposite direction. If the direction of receiver-chip sequence drift is known, however, then the initial misalignment can be eliminated. Once the correlation function is plotted, one of several techniques can be used to determine optimal receiver-chip sequence/transmitter-chip sequence position: a) the peak signal level can be used; b) the outer bounds of the correlation function can be determined and then divided by two in order to estimate the middle, or peak, of the correlation function. Both of these techniques can be used in conjunction with slope information to further optimize alignment position. Equivalent correlation peak determination/prediction method can provide this function.

The receiver optionally can keep track of the information gained in the previously described algorithms to identify the rate and the direction of the receiver-chip sequence misalignment drift with respect to the transmitter-chip sequence. Upon determining the drift rate and direction, the receiver can further use this information as a second order correction function to the receiver-chip sequence reposition algorithm. The correction function can be used in between the times when the receiver actually samples the correlation improvement of the carrier. In this way, the receiver can lengthen the time between dummy bits which may have to be inserted by the transmitter. Alternatively, further reduced accuracy crystals can be used.

If the transmitter does not use a constant carrier data modulation, or if data are demodulated at the maximum achievable SNR for a certain bit error rate, then after the beginning of a new transmission, and initial receiver-chip sequence alignment to the transmitter-chip sequence, the transmitter inserts dummy bits; the receiver knows when these dummy bits occur so that the receiver can perform the receiver-chip sequence re-optimization algorithm. For the receiver to be able to identify the dummy bits, the transmitter sends a marker in the transmitted message designed to notify the receiver where to find the dummy bit times in the subsequent message. This marker can be a signal strength, frequency or phase variation, or a special data key or the like. The marker need only appear once in the message, provided the subsequent dummy bits appear in the transmitted message in some preset fashion which the receiver likewise knows and searches.

If, on the other hand, the dummy bits are inserted at times which are not known by the receiver, then the transmitter retransmits the marker each time to alert the receiver as to when the dummy bits reoccur so that the receiver can execute its chip sequence re-optimization algorithm.

Figure 2:
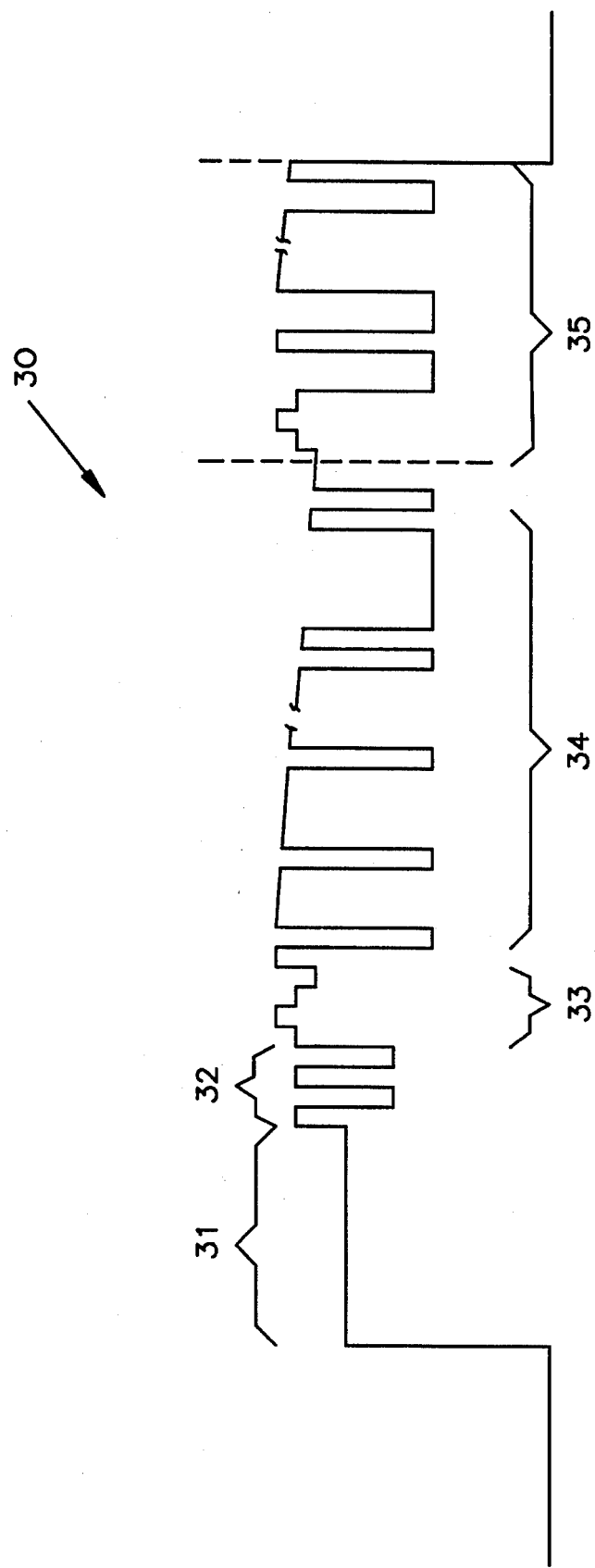
FIG. 2 illustrates a received transmitter message using ASK data.

As illustratively shown in FIG. 2, a preferred embodiment of the instant invention uses ASK data 30 and sends a marker 32, i.e., a synchronization byte of a set pattern, subsequent to the period for initial synchronization 31 and prior to sending subsequent information data bits. The transmitter then inserts several dummy bits 33 after the ASK synchronization marker 32. The initial synchronization feature queues the receiver to use the subsequent dummy bits 33 to perform a receiver-chip sequence re-optimization algorithm. Further, in this example, the transmitter automatically reinserts dummy bits once every eight data bytes 35. The receiver's algorithm is aware of the automatic reinsertion and uses the same timing spacing 34 so that the receiver can automatically perform subsequent receiver-chip sequence timing re-optimizations every eight bytes during the times when these subsequent dummy bits are transmitted. In this manner, the transmitter can send an arbitrarily long data message while the receiver maintains receiver-chip sequence alignment with the transmitter-chip sequence, with no greater than ¼ chip code alignment error resulting from crystal drift between the transmitter and receiver.

The marker generated by the transmitter is also useful in systems which use chip sequence position for external synchronization applications. Many spread-spectrum systems such as the global positioning satellite (GPS) system rely on the time synchronization provided by the chip sequence alignment to measure the time-of-flight of radio waves so that a time delay can be converted into distance and ultimately latitude/ longitude/altitude position fixes. An example of a radio position system is discussed in U.S. Pat. No. 4,799,062, entitled RADIO POSITION DETERMINATION METHOD AND APPARATUS, to Sanderford, which is incorporated herein by reference. In such systems, the marker can likewise reduce the crystal accuracy needed at remote devices. Such a reduction in required accuracy is possible because in a typical time-of-flight system, the chip sequence optimization position can occur over the duration of the entire transmitted message or at varying positions within a received message. Therefore the crystal drift at a remote unit can negatively effect the accuracy of the time-of-flight reading. By using the transmitted marker 32, the devices, remote or otherwise, can take a chip sequence phase position reading which is optimized to the correlation peak at a known time distance from the purposely generated marker within a received message. Therefore, the crystal drift error term can be reduced by several orders of magnitude since the drift factor that affects the time-of-flight measurement is reduced to several bits, as opposed to potentially an entire message.

Radio location systems that measure time-of-flight have a further requirement called lane counting. When a transmission is received from a distant station, the time delay of the transmission can be greater than that of the receiver-chip sequence repetition rate. When this happens, the chip sequence alignment yields an ambiguous range reading since the chip sequence position has rolled over one or more times.

The maximum unambiguous ranging reading from a time-of-flight hyperbolic system is called a lane. For example, a time-of-flight radio location system which uses a five megachip per second code rate and a 127 chip code length would have a code repetition rate of 26 milliseconds, and therefore a lane distance of approximately five miles. Transmissions from distances greater than five miles incorrectly roll over into a zero to five mile position determination.

The marker 32, which is purposely embedded into the transmitted message for the purpose of receiver-chip sequence realignment, also can generate a time stamp by which a macro-level timer can be used in increments of chip sequence repetition times. Providing the embedded feature contains aspects which change in a time span equal to or shorter than a chip sequence repetition rate, then the feature can be used to initiate a timer, or to generate a time marker from a modulo counter, with resolution which is seamless and dovetails with the chip sequence phase positions. This macro-level time marker can be used to greatly enhance the unambiguous range measurements in a time-of-flight radio location system.

In a hyperbolic time-of-flight radio location system, ambiguous relative time-of-flight measurements also generate multiple hyperbolic intersections causing ambiguous or multiple position fixes. The macro level timing just discussed, which is made possible by the embedded marker on the transmitted message, also serves to eliminate multiple ambiguous position fixes in a time-of-flight hyperbolic radio location system.

Figure 3:
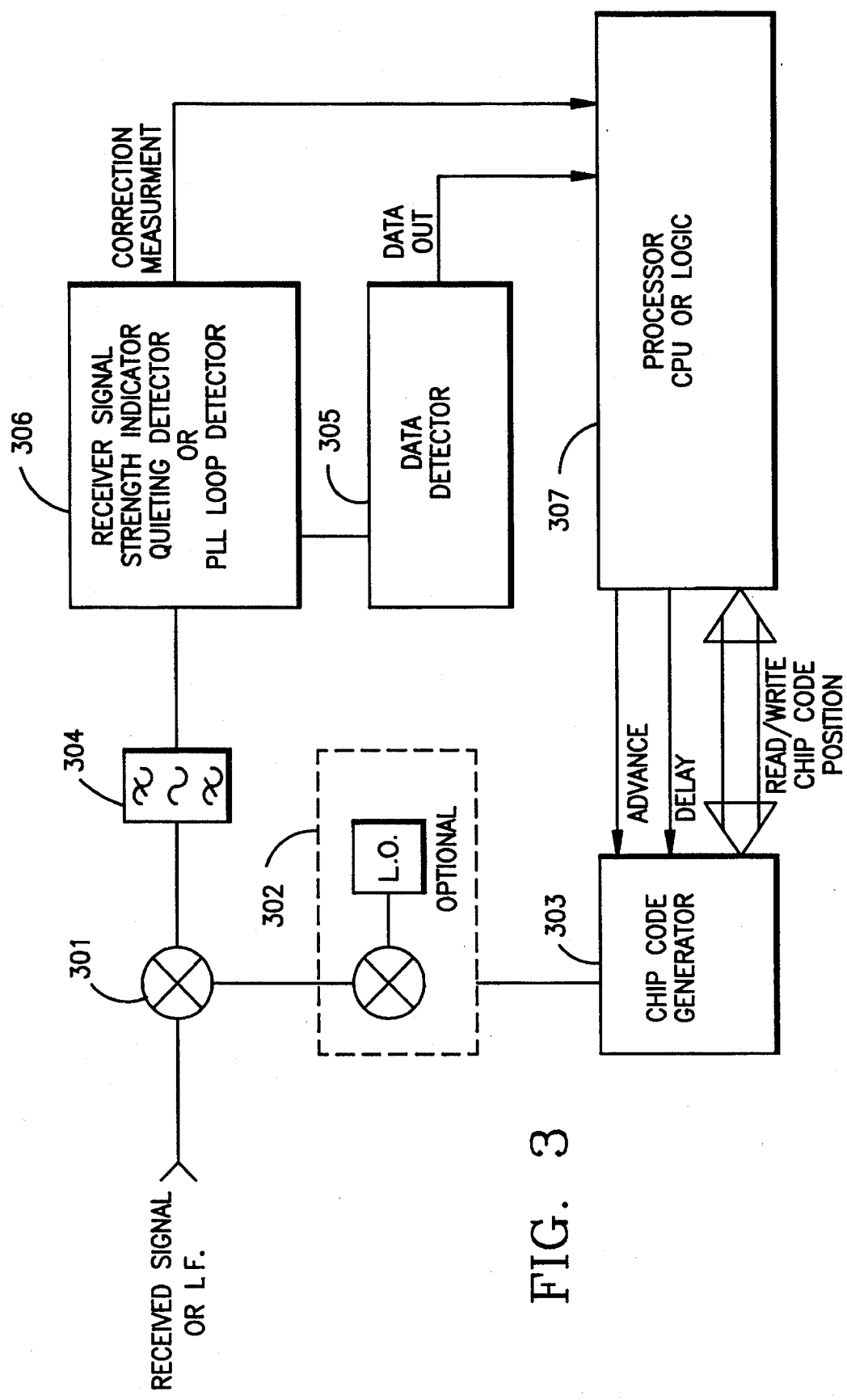
FIG. 3 illustrates an example of receiver circuitry as used with the present invention.

As illustratively shown in FIG. 3, the received signal, after passing through a receiver front-end and optionally undergoing a down conversion and appropriate filtering, as is well known in the art, is first applied to mixer 301. Mixer 301 provides bandwidth compression of an incoming spread spectrum signal to yield a compressed non-spread spectrum signal on mixer's output port. Mixer 301 is injected on the local oscillator port either directly by the chip code generator 303 or alternatively by a mixer/local oscillator combination 302. The mixer/local oscillator combination 302 provides the optional second or third down conversion of the received signal to yield lower IF frequencies, as is well known in the art.

The chip code generator 303 provides the spread spectrum direct sequence modulation output. Appropriate chip code generators can be fashioned from an exclusive OR gate tapped shift register with feedback, or a random access memory/read only memory (RAM/ROM) look-up table wherein the appropriate chip code pattern is stored, or a serial shift register wherein the appropriate chip code pattern is stored, or any other means, as is well known in the art. The instant invention uses a sequentially addressed ROM look-up table to store and recall the chip code pattern. The chip code generator 303 also has several inputs. The several inputs are designed to alter the time/phase offset of the repetitive chip code output. The advance input causes a time advance of the chip code position. The delay input causes a time delay of the chip code position. The advance and delay inputs can be in units of multiple chips, a single chip or in units of a portion of a chip. In the instant invention, the advance and delay lines are selected in two chip, one chip, or one-quarter chip increments. Further, the chip code generator 303 is equipped with an input/output port which allows the processor 307 to read and write the chip code alignment phase.

The chip code phase/alignment position output port allows the processor 307 to determine the aggregate time/phase position offset which has been selected/optimized by the processor 307. When the processor 307 reads the chip code phase position from the chip code generator 303, the processor 307, is able to time stamp the phase/alignment position of an incoming received signal with a high degree of accuracy. The ability to read the chip code phase position allows the processor 307 to determine relative time-of-arrival measurements and to compare the chip code phase position to either a time reference or to another incoming received signal. The relative time-of-arrival information of the received signal can then be used to calculate a distance or a hyperbolic line of position. In addition to reading the chip code phase position, processor 307 can also set any chip code phase position by writing the input port of the chip code generator 303.

As illustrated in the preferred embodiment, a band pass filter 304 serves to eliminate received noise outside of the compressed output of mixer 301. The filtered signal from the bandpass filter 304 is provided to a received signal strength indication (RSSI) quieting detector 306 which makes possible a measurement of correlation. The RSSI quieting detector 306 can be fashioned from available components which either measure signal strength or quieting detection or phase lock detection. Alternatively, the RSSI quieting detector could be located in earlier blocks of the receiver. The output of the RSSI quieting detector 306 provides a measurement of correlation to the processor 307 so that the processor 307 can perform the reposition algorithm. The RSSI quieting detector 306 can also provide part, or all, of the components necessary for data detection. Alternatively, the RSSI quieting detector 306 can be separate from the data detector 305, in which case the data detector 305 would connect directly to the bandpass filter 304 output. The data detector 305 can be formed from any of the modulation detectors, as is well known in the art, such as amplitude modulation, frequency modulation or phase modulation methods.

The purpose of the data detector 305 is to provide a data output to the processor 307, so that the processor 307 can detect the presence of a marker and execute the reposition algorithm. The instant invention uses amplitude modulation as the data detector 305, with the data detector 305 using the RSSI quieting detector 306. Further, in the instant invention, the signal strength indication provides both correlation measurement and data amplitude information. The correlation measurement output of the RSSI quieting detector 306 is therefore also used by the processor 307 to decode data output. In the preferred embodiment of the instant invention, the data detector 305 not a separate unit, but is part of the RSSI quieting detector 306.

The processor 307 can be a micro-computer or digital logic, or discrete components, or an application specific integrated circuit (ASIC), or equivalent means which can run the reposition algorithm. The instant invention uses an analog to digital convertor to translate the correlation measurement input into a digital representation of correlation level and of the AM data modulation output. The microprocessor in the instant invention further controls the advance and delay of the chip code phase position of the chip code generator 303 and identifies the presence of a marker and reads the phase position of a received signal for time-of-flight applications.

It will be apparent to those skilled in the art that various modifications may be made to the spread spectrum alignment repositioning method and apparatus of the instant invention without departing from the scope or spirit of the invention, and it is intended that the present invention cover modifications and variations of the spread spectrum alignment repositioning method and apparatus provided they come within the scope of the appended claims and their equivalents.

We claim:

1. A method, using a processor at a receiver, for maintaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization, a marker, and data, the period for initial synchronization, the marker, and the data, processed with the transmitter-chip sequence;

transmitting, from the transmitter, the spread-spectrum signal using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, the marker of the transmitted spread-spectrum signal;

initiating, at the receiver, upon detecting the marker of the transmitted spread-spectrum signal, a first reposition delay from the marker;

demodulating, at the receiver, using the receiver-chip sequence, the data from the spread-spectrum signal during the first reposition delay;

realigning, at the receiver, after the first reposition delay, the receiver-chip sequence with the transmitter-chip sequence of the spread-spectrum signal; and demodulating, at the receiver, the data from the spread-spectrum signal after realigning the receiver-chip sequence.

2. The method as set forth in claim 1 wherein the step of generating, at the transmitter, the spread-spectrum signal, includes the step of generating a predefined bit sequence as a marker for initial synchronization, with the predefined bit sequence including a 1-bit and a 0-bit.

3. The method as set forth in claim 1:

wherein the step of generating, at the transmitter, includes the step of generating, at the transmitter, the spread-spectrum signal, with the spread-spectrum signal having the period for initial synchronization, the marker, a plurality of dummy bits, and the data, with the plurality of dummy bits following the period for initial synchronization and the marker, with the period for initial synchronization, the marker, the plurality of dummy bits and the data, processed with the transmitter-chip sequence; and wherein the step of realigning, at the receiver, includes the step of realigning the receiver-chip sequence with the transmitter-chip sequence during transmission of the plurality of dummy bits.

4. The method as set forth in claim 1 wherein the step of realigning, at the receiver, includes the step of predicting, using chip-sequence-alignment-re-optimization samples, a second order drift correction of a time base of said receiver.

5. The method as set forth in claim 1, further including the step, at the receiver, after detecting the marker, of initiating at least one of a phase measurement and a time stamp of receiver-chip sequence alignment at a known position in the transmitted spread-spectrum signal for reducing effects of time base drift on a time-of-flight radio location system.

6. The method as set forth in claim 1 further including the step, at the receiver, after detecting the marker, of increasing lane distance and providing unambiguous range measurement greater than a chip code repetition time in a time-of-flight radio location system.

7. The method as set forth in claim 1, further including the step, at the receiver, after detecting the marker, of increasing lane distance and providing unambiguous hyperbolic intersections greater than that of a code repetition time in a time-of-flight radio location system.

8. The method as set forth in claim 3, 4, 5, 6 or 7 wherein the step of generating, at the transmitter, the spread-spectrum signal, includes the step of generating a predefined bit sequence, said predefined bit sequence being unique from transmitted data, as a marker for initial synchronization.

9. The method as set forth in claim 3, 4, 5, 6 or 7 wherein the step of generating, at the transmitter, the spread-spectrum signal, includes the step of generating a predefined bit sequence as a marker for initial synchronization with the predefined bit sequence.

10. A method using a processor at a receiver, for maintaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization and a marker, with the period for initial synchronization and the marker processed with the transmitter-chip sequence;

transmitting, from the transmitter, the spread-spectrum signal, using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, an arrival of the marker in the transmitted spread-spectrum signal; and realigning, at the receiver, upon detecting the marker in the transmitted spread-spectrum signal, the receiver-chip sequence with the transmitted-chip sequence of the spread-spectrum signal, within one chip time period.

11. The method as set forth in claim 10 wherein the step of generating, at the transmitter, the spread-spectrum signal, includes the step of generating a predefined bit sequence as a marker to initiate re-position of code synchronization with the predefined bit sequence.

12. The method as set forth in claim 10:

wherein the step of generating, at the transmitter, includes the step of generating, at the transmitter, the spread-spectrum signal, with the spread-spectrum signal having the period for initial synchronization, the marker, and a plurality of dummy bits, with the plurality of dummy bits following the period for initial synchronization and the marker, with the period for initial synchronization, the marker, and the plurality of dummy bits processed with the transmitter-chip sequence; and wherein the step of realigning, at the receiver, includes the step of realigning the receiver-chip sequence with the transmitter-chip sequence during transmission of the plurality of dummy bits.

13. The method as set forth in claim 10 wherein the step of realigning, at the receiver, includes the step of predicting, using chip-sequence-alignment-re-optimization samples, a second order drift correction of a time base of said receiver.

14. The method as set forth in claim 10, further including the step, at the receiver, after detecting the marker, of initiating at least one of a phase measurement and a time stamp of receiver-chip sequence alignment at a known position in the transmitted spread-spectrum signal for reducing effects of time base drift on a time-of-flight radio location system.

15. The method as set forth in claim 10 further including the step, at the receiver, of time stamping the arrival of the marker, for increasing lane distance and providing unambiguous range measurement greater than a chip code repetition time in a time-of-flight radio location system.

16. The method as set forth in claim 10, further including the step, at the receiver, of time stamping the arrival of the marker, for increasing lane distance and providing unambiguous hyperbolic intersections greater than that of a code repetition time in a time-of-flight radio location system.

17. The method as set forth in claim 10, 12, 13, 14, 15 or 16 wherein the step of generating, at the transmitter, the spread spectrum signal, includes the step of generating a predefined bit sequence, said predefined bit sequence being unique from transmitted data, as a marker to initiate repositioning of code synchronization.

18. The method as set forth in claim 10, 12, 13, 14, 15 or 16 wherein the step of generating, at the transmitter, the spread-spectrum signal, includes the step of generating a predefined bit sequence as a marker for initial synchronization with the predefined bit sequence.

19. A method, using a processor at a receiver, for maintaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization, and a marker, with the period for initial synchronization, and the marker, processed with the transmitter-chip sequence;

transmitting, from the transmitter, the spread-spectrum signal using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, an arrival of the marker in the transmitted spread-spectrum signal; and realigning, at the receiver, after a delay from the marker, the receiver-chip sequence with the transmitter-chip sequence in the spread-spectrum signal within one chip time period.

20. The method as set forth in claim 19 wherein the step of generating, at the transmitter, the spread spectrum signal, includes the step of generating a predefined bit sequence, said predefined bit sequence being unique from transmitted data, as a marker to initiate repositioning of code synchronization.

21. The method as set forth in claim 19 wherein the step of generating, at the transmitter, the spread-spectrum signal, includes the step of generating a predefined bit sequence, said predefined bit sequence being unique from transmitted data, as a marker for initial synchronization with the predefined bit sequence.

22. The method as set forth in claim 19:

wherein the step of generating, at the transmitter, includes the step of generating, at the transmitter, the spread-spectrum signal, with the spread-spectrum signal having the period for initial synchronization, the marker, and a plurality of dummy bits, with the plurality of dummy bits following the period for initial synchronization and the marker, the period for initial synchronization, the marker, and the plurality of dummy bits processed with the transmitter-chip sequence; and wherein the step of realigning, at the receiver, includes the step of realigning the receiver-chip sequence with the transmitter-chip sequence during transmission of the plurality of dummy bits.

23. The method as set forth in claim 19 wherein the step of realigning, at the receiver, includes the step of predicting, using chip-sequence-alignment-re-optimization samples, a second order drift correction of a time base of said receiver.

24. The method as set forth in claim 19, further including the step, at the receiver, after detecting the marker, of initiating at least one of a phase measurement and a time stamp of receiver-chip sequence alignment at a known position in the transmitted spread-spectrum signal for reducing effects of time base drift on a time-of-flight radio location system.

25. The method as set forth in claim 19 further including the step, at the receiver, of time stamping the arrival of the marker, for increasing lane distance and providing unambiguous range measurement greater than a chip code repetition time in a time-of-flight radio location system.

26. The method as set forth in claim 19, further including the step, at the receiver, of time stamping the arrival of the marker, for increasing lane distance and providing unambiguous hyperbolic intersections greater than that of a code repetition time in a time-of-flight radio location system.

27. The method as set forth in claim 21, 22, 23, 24, 25 or 26 wherein the step of generating, at the transmitter, the spread spectrum signal, includes the step of generating a predefined bit sequence, said predefined bit sequence being unique from transmitted data, as a marker to initiate repositioning of code synchronization.

28. The method as set forth in claim 21, 22, 23, 24, 25 or 26 wherein the step of generating, at the transmitter, the spread-spectrum signal, includes the step of generating a predefined bit sequence as a marker for initial synchronization with the predefined bit sequence.

29. A method, using a processor at a receiver, for maintaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization, and at least one of a plurality of markers and a plurality of dummy bits, with the period for initial synchronization, the plurality of markers, and the plurality of dummy bits processed with the transmitter-chip sequence;

determining a maximum time between each of the plurality of markers and the plurality of dummy bits based on at least one of bit error rate and minimal detectable signal;

inserting to the spread-spectrum signal at least one of a marker and dummy bits, prior to the determined maximum time;

transmitting, from the transmitter, the spread-spectrum signal using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, at least one of the marker and the dummy bits of the transmitted spread-spectrum signal; and realigning, at the receiver, after detecting at least one of the marker and the dummy bits, the receiver-chip sequence with the transmitter-chip sequence of in the spread-spectrum signal, to within one chip time.

30. The method as set forth in claim 29 wherein the step of generating, at the transmitter, the spread-spectrum signal, includes the step of generating a predefined bit sequence as a marker for initial synchronization.

31. The method as set forth in claim 29 wherein the step of realigning, at the receiver, includes the step of realigning the receiver-chip sequence with the transmitter-chip sequence during at least one of the marker and the dummy bits.

32. The method as set forth in claim 29 wherein the step of realigning, at the receiver, includes the step of predicting, with chip-sequence-alignment-re-optimization samples, a second order drift correction of a time base of said receiver.

33. The method as set forth in claim 29, further including the step, at the receiver, after detecting at least one of the marker and the dummy bits, of initiating at least one of a phase measurement and a time stamp of receiver-chip sequence alignment at a known position in the transmitted spread-spectrum signal for reducing effects of time base drift on a time-of-flight radio location system.

34. The method as set forth in claim 29 further including the step, at the receiver, after detecting at least one of the marker and the dummy bits, of time stamping the transmitted spread-spectrum signal for increasing lane distance and providing unambiguous range measurement greater than a chip code repetition time in a time-of-flight radio location system.

35. The method as set forth in claim 29, further including the step, at the receiver, after detecting at least one of the marker and the dummy bits, of time stamping the transmitted spread-spectrum signal for increasing lane distance and providing unambiguous hyperbolic intersections greater than that of a code repetition time in a time-of-flight radio location system.

36. The method as set forth in claim 29, 31, 32, 33, 34 or 35 wherein the step of generating, at the transmitter, the spread spectrum signal, includes the step of generating a predefined bit sequence, said predefined bit sequence being unique from transmitted data, as a marker to initiate repositioning of code synchronization.

37. The method as set forth in claim 29, 31, 32, 33, 34 or 35 wherein the step of generating, at the transmitter, the spread-spectrum signal, includes the step of generating a predefined bit sequence as a marker for initial synchronization with the predefined bit sequence.

38. A method, using a processor at a receiver, for maintaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization, and data, with the period for initial synchronization, and the data, processed with the transmitter-chip sequence;

transmitting, from the transmitter, the spread-spectrum signal using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

demodulating, at the receiver, using the receiver-chip sequence, the data from the spread-spectrum signal during a first predetermined time interval;

realigning, at the receiver, after the first predetermined time interval, the receiver-chip sequence with the transmitter-chip sequence of the spread-spectrum signal; and demodulating, at the receiver, the data from the spread-spectrum signal after realigning the receiver-chip sequence.

39. The method as set forth in claim 38 wherein the step of generating, at the transmitter, the spread-spectrum signal, includes the step of generating a predefined bit sequence as a marker for initial synchronization with the predefined bit sequence.

40. The method as set forth in claim 38 wherein the step of generating, at the transmitter, the spread spectrum signal, includes the step of generating a predefined bit sequence, said predefined bit sequence being unique from transmitted data, as a marker to initiate repositioning of code synchronization.

41. The method as set forth in claim 38:

wherein the step of generating, at the transmitter, includes the step of generating, at the transmitter, the spread-spectrum signal, with the spread-spectrum signal having the period for initial synchronization, a plurality of dummy bits, and the data, with the plurality of dummy bits following the period for initial synchronization, with the period for initial synchronization, the plurality of dummy bits and the data processed with the transmitter-chip sequence; and wherein the step of realigning, at the receiver, includes the step of realigning the receiver-chip sequence with the transmitter-chip sequence during transmission of the plurality of dummy bits.

42. The method as set forth in claim 38 wherein the step of realigning, at the receiver, includes the step of predicting, with chip-sequence-alignment-re-optimization samples, a second order drift correction of a time base of said receiver.

43. The method as set forth in claim 38, further including the step, at the receiver, after the step of realigning, of initiating at least one of a phase measurement and a time stamp of receiver-chip sequence alignment at a known position in the transmitted spread-spectrum signal for reducing effects of time base drift on a time-of-flight radio location system.

44. The method as set forth in claim 38 further including the step, at the receiver, after the step of realigning, of increasing lane distance and providing unambiguous range measurement greater than a chip code repetition time in a time-of-flight radio location system.

45. The method as set forth in claim 38, further including the step, at the receiver, of time stamping, for increasing lane distance and providing unambiguous hyperbolic intersections greater than that of a code repetition time in a time-of-flight radio location system.

46. The method as set forth in claim 41, 42, 43, 44 or 45 wherein the step of generating, at the transmitter, the spread-spectrum signal, includes the step of generating a predefined bit sequence, said predefined bit sequence being unique from transmitted data, as a marker to initiate repositioning of code synchronization.

47. The method as set forth in claim 41, 42, 43, 44 or 45 wherein the step of generating, at the transmitter, the spread-spectrum signal, includes the step of generating a predefined bit sequence as a marker for initial synchronization with the predefined bit sequence.

48. A method, using a processor at a receiver, for maintaining synchronization with a transmitter-chip sequence of a spread-spectrum signal transmitted from a transmitter to the receiver, comprising the steps of: generating, at the transmitter, the spread-spectrum signal, with the spread-spectrum signal having a period for initial synchronization, a marker, and data, the period for initial synchronization, the marker, and the data, processed with the transmitter-chip sequence;

transmitting, from the transmitter, the spread-spectrum signal using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, the marker of the transmitted spread-spectrum signal;

initiating, at the receiver, upon detecting the marker of the transmitted spread-spectrum signal at the receiver, a first reposition delay from the marker;

demodulating, at the receiver, using the receiver-chip sequence, the data from the spread-spectrum signal during the first reposition delay;

realigning, at the receiver, upon the first reposition delay reaching a predetermined value less than a determined acceptable loss in any of minimal detectable signal and bit error rate, the receiver-chip sequence with the transmitter-chip sequence of the spread-spectrum signal; and demodulating, at the receiver, the data from the spread-spectrum signal after realigning the receiver-chip sequence.

49. The method as set forth in claim 48 wherein the step of generating, at the transmitter, the spread-spectrum signal, includes the step of generating a predefined bit sequence as a marker for initial synchronization with the predefined bit sequence.

50. The method as set forth in claim 48:

wherein the step of generating, at the transmitter, includes the step of generating, at the transmitter, the spread-spectrum signal, with the spread-spectrum signal having the period for initial synchronization, the marker, a plurality of dummy bits and the data, with the plurality of dummy bits following the period for initial synchronization and the marker, with the period for initial synchronization, the marker, the plurality of dummy bits and the data, processed with the transmitter-chip sequence; and wherein the step of realigning, at the receiver, includes the step of realigning the receiver-chip sequence with the transmitter-chip sequence during transmission of the plurality of dummy bits.

51. The method as set forth in claim 48 wherein the step of realigning, at the receiver, includes the step of predicting, using chip-sequence-alignment-re-optimization samples, a second order drift correction of a time base of said receiver.

52. The method as set forth in claim 48, further including the step, at the receiver, after detecting the marker, of initiating at least one of a phase measurement and a time stamp of receiver-chip sequence alignment at a known position in the transmitted spread-spectrum signal for reducing effects of time base drift on a time-of-flight radio location system.

53. The method as set forth in claim 48 further including the step, at the receiver, of time stamping a receipt of the marker for increasing lane distance and providing unambiguous range measurement greater than a chip code repetition time in a time-of-flight radio location system.

54. The method as set forth in claim 48, further including the step, at the receiver, of time stamping a receipt of the marker, for increasing lane distance and providing unambiguous hyperbolic intersections greater than that of a code repetition time in a time-of-flight radio location system.

55. The method as set forth in claim 48, 50, 51, 52, 53, or 54 wherein the step of generating, at the transmitter, the spread spectrum signal, includes the step of generating a predefined bit sequence, said predefined bit sequence being unique from transmitted data, as a marker to initiate repositioning of code synchronization.

56. The method as set forth in claim 48, 50, 51, 52, 53 or 54 wherein the step of generating, at the transmitter, the spread-spectrum signal, includes the step of generating a predefined bit sequence as a marker for initial synchronization with the predefined bit sequence.

57. A method using a processor at a receiver, for obtaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization and a marker, with the period for initial synchronization and the marker processed with the transmitter-chip sequence;

transmitting, from the transmitter, the spread-spectrum signal, using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, the marker in the transmitted spread-spectrum signal; and measuring, at the receiver, in response to the receiver detecting the marker in the transmitted spread-spectrum signal, at least one of a phase and a time position of receiver-chip sequence alignment to time stamp a known position in the transmitted spread-spectrum signal for reducing effects of time base drift on a time-of-flight radio location system.

58. A method using a processor at a receiver, for obtaining synchronization with a transmitter-chip sequence of a spread-spectrum signal transmitted from a transmitter to the receiver, comprising the steps of:

generating, at the transmitter, the spread-spectrum signal, with the spread-spectrum signal having a period for initial synchronization and a marker, with the period for initial synchronization and the marker processed with the transmitter-chip sequence;

transmitting, from the transmitter, the spread-spectrum signal, using radio waves;

generating, at the receiver, a receiver-chip sequence;

synchronizing, to within one chip time, at the receiver, during the period for initial synchronization, the receiver-chip sequence to the transmitter-chip sequence of the spread-spectrum signal;

detecting, at the receiver, the marker in the transmitted spread-spectrum signal;

realigning, at the receiver, upon detecting the marker in the transmitted spread-spectrum signal, the receiver-chip sequence, with the transmitted-chip sequence of the spread-spectrum signal, within one chip time period; and measuring, at the receiver, in response to the receiver detecting the marker in the transmitted spread-spectrum signal, at least one of a phase and a time position of receiver-chip sequence alignment to time stamp a known position in the transmitted spread-spectrum signal for reducing effects of time base drift on a time-of-flight radio location system.

* * * * *